Sept. 7, 1943.   C. E. COATES ET AL   2,328,784
WELDING METHOD AND APPARATUS
Filed Feb. 15, 1941   2 Sheets-Sheet 1

Inventors.
CLYDE E. COATES
JOSEPH H. COOPER
By Francis J. Klempay
Attorney

Sept. 7, 1943.  C. E. COATES ET AL  2,328,784
WELDING METHOD AND APPARATUS
Filed Feb. 15, 1941   2 Sheets-Sheet 2
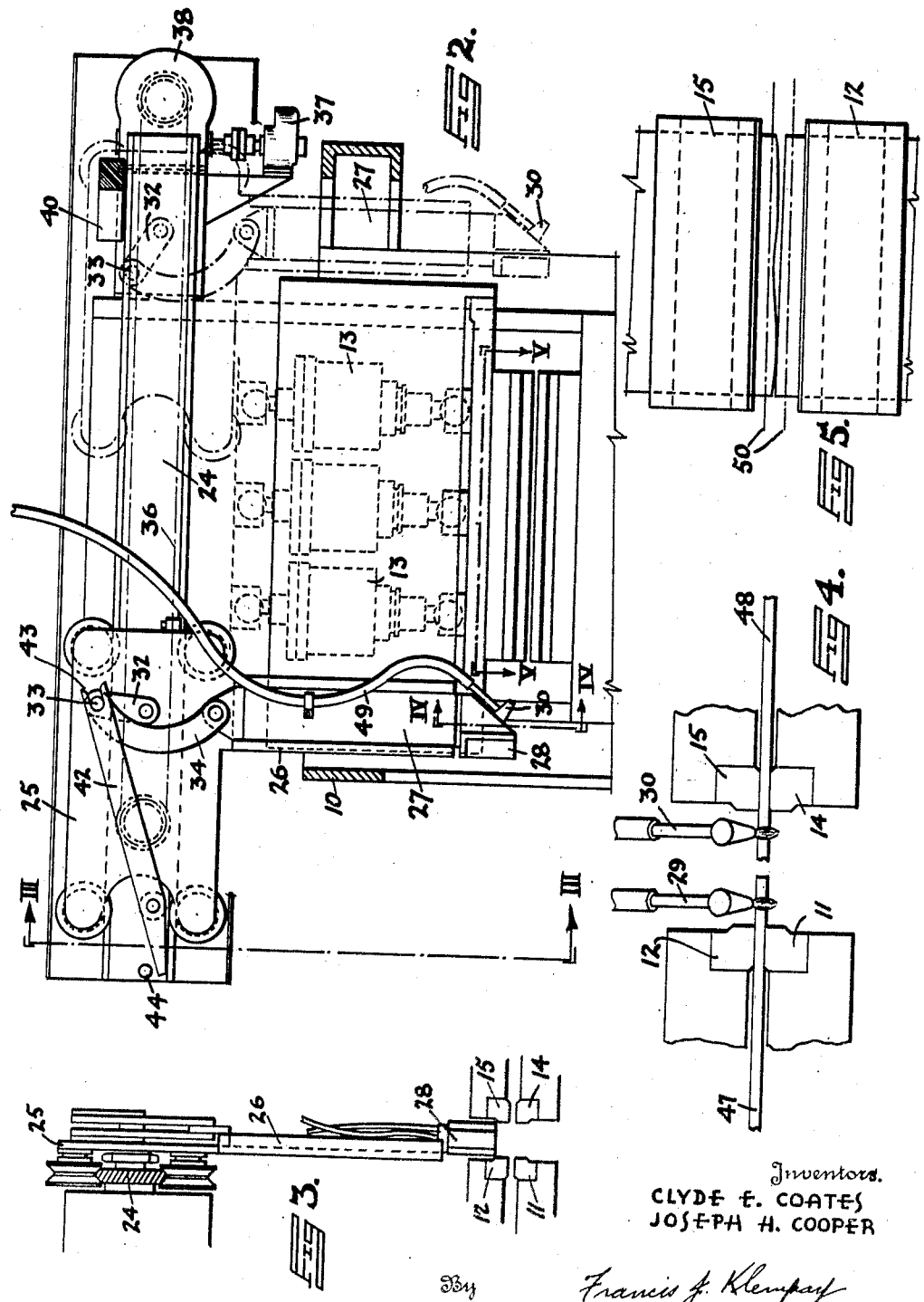
Inventors.
CLYDE E. COATES
JOSEPH H. COOPER
By Francis J. Klempay
Attorney Patented Sept. 7, 1943

2,328,784

UNITED STATES PATENT OFFICE 2,328,784

WELDING METHOD AND APPARATUS

Clyde E. Coates and Joseph H. Cooper, Warren, Ohio, assignors to Taylor-Winfield Corporation, Warren, Ohio, a corporation of Ohio Application February 15, 1941, Serial No. 379,080

10 Claims. (219—10)

This invention relates to the welding art and more particularly to the art of butt welding together in endwise relation successive pieces or lengths of metal sections, the width of which is many times the thickness thereof, such as metal sheet and strip. The uniform butt welding of the edges of adjoining pieces of sheet or strip particularly in the thinner gauges and greater widths thereof, the latter of which may under modern strip mill practice reach 100 inches, presents considerable difficulties in the matters of alignment and the obtaining of the required uniformity of heating and welding pressure along the line of weld. The welds are commonly effected in an electric flash welder which operates to grasp the adjoining pieces of strip adjacent their contiguous ends, to strike an arc thereby heating the edges and burning off particles protruding an undesirable amount from the faces of the edges, to bring the edges together with or without additional heating, and finally to upset the edges thereby completing the weld.

In order that the joined pieces of strip have the required longitudinal alignment, it is necessary that the pieces be in alignment at the time of setting of the softened metal, i. e., in the welding machine, and therefore the pieces must be accurately trimmed with relation to the angularity of the welding dies before the welding is affected. In butt welding strip it is essential that the projection of the edges from the faces of the welding dies or electrodes be kept within certain close limits to insure uniformity of heating along the edges and the transmission of sufficient welding pressure to effect adhesion along the entire width of the strip. Heretofore the trimming has been effected by employing a highly accurate shear in the line of travel of the strip and the extent of strip projection from the faces of the clamping electrodes has been gauged by employing a retractable spacer bar in the welder itself which mechanisms along with their ancillary devices such as side guides and controls contribute materially to the complexity and cost of the equipment.

It is accordingly the primary object of the invention to provide an improved method and apparatus for butt welding metal sheet and strip whereby the welds may be effected in less time and more economically while employing less and substantially simplified apparatus. This is accomplished in accordance with the preferred embodiment of the invention by employing in the electric welding machine a pair of gas torch cutters which are automatically maintained in proper spaced relation with respect to the adjacent faces of the strip clamping electrodes and which are operative to trim the adjoining edges of the strip pieces while the latter are clamped in the machine. The torch cuts are most advantageous for the purposes involved since simultaneously with the cutting the adjacent metal of the pieces of strip is preheated to a considerable extent thereby reducing the maximum temperature gradient which ordinarily results from the high rate of heat input required to effect the welding at a practicable rate and a softer and more ductile weld results. This is a distinct advantage when the resulting welds are to be cold reduced. Further, while the line of torch cut is generally linear, the surface is left with a series of small projections and undulations of substantially uniform extent which facilitates the starting and spread of the arc thereby enabling the starting voltage to be reduced with the consequent advantage of reducing the burning of the metal and the amount of metal blown out to a minimum.

These and other objects and advantages of the invention will become apparent from a consideration of the following detailed specification and the accompanying drawings wherein there is specifically disclosed a preferred embodiment of the invention.

In the drawings:

Figure 2 is a sectional view of the apparatus of Figure 1, the view being taken along the line II—II of Figure 1;

Figure 3 is a side view of a portion of the apparatus shown in Figure 2; and

Figures 4 and 5 are side and plan views, respectively of a fragmentary portion of the apparatus, which views illustrate an important principle of the invention.

Figure 1:
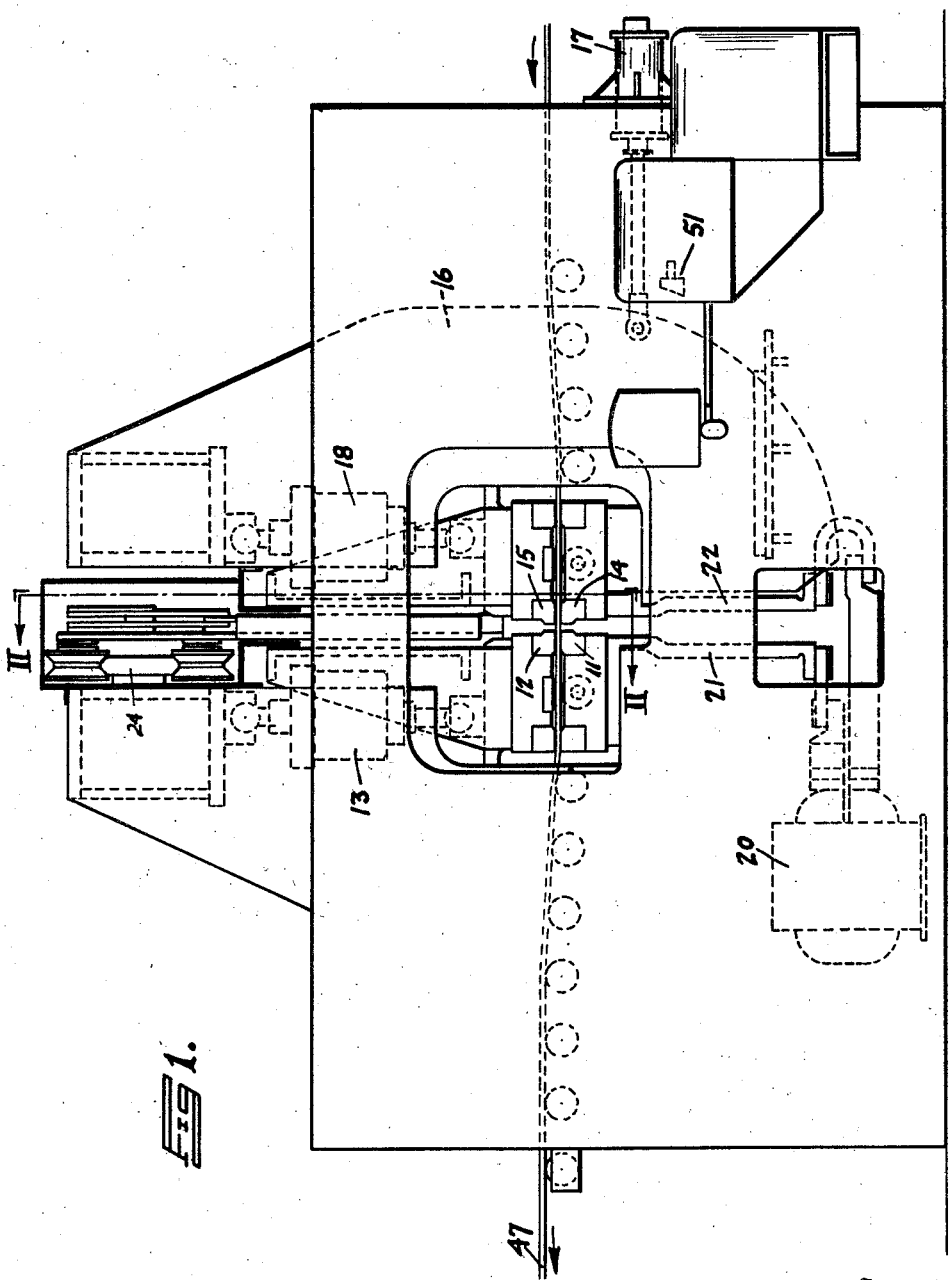
Figure 1 is a side view of an apparatus constructed in accordance with the principles of the invention.

Referring to the drawings which illustrate the invention as applied to a strip welder of usual design, reference numeral 10 designates the frame of the welding machine which supports two pairs of welding electrodes or dies each of which is operative to clamp and convey welding current to a piece of strip or sheet. One pair of dies, 11 and 12, is fixed longitudinally of the machine with the upper die 12 adapted to be raised and lowered by the air or hydraulic cylinders 13. The other pair of dies marked 14 and 15, are carried by a slide 16 which is movable longitudinally of the machine by any suitable mechanism as the fluid pressure motor 17. Die 15 is adapted to be raised and brought into pressure engagement with the strip by the fluid pressure cylinders 18 which may conveniently be carried by the slide 16. Welding current is supplied to the die sets from the transformer 20 through secondary circuit connections 21 and 22, the latter being flexible to allow for longitudinal movement of the slide which carries the die set 14 and 15.

Supported from the fixed frame 10 of the machine and extending transversely thereof intermediate the fixed and slideable portions of the machine is a track bar 24 on which travels a carriage 25. Depending from carriage 25 is a vertical guide 26 adapted to slideably receive a carrier 27. To the lower end of carrier 27 is attached a die cleaner 28 having cutting tools on either side thereof and on the back side of the die cleaner is a pair of gas cutting torches 29 and 30, which are rigidly mounted on the die cleaner.

Pivotally mounted on carriage 25 is a toggle link 32 which through pin 33 is pivotally connected with a second toggle link 34, the link 34 being in turn pivotally connected with the carrier 27. With the parts in position as shown in full lines in Figure 2, the carrier 27 is in uppermost position and the die cleaner 28 is in an inoperative position considerably above the protruding faces of the strip clamping dies. In this position, however, the torches 29 and 30 are operative to direct the cutting flames onto the top surfaces of the pieces of strip as indicated in Figure 4 when the torches are moved transversely across the machine. Carriage 25 and consequently members 27 through 30 are moved transversely of the machine by a chain 36 which is driven by a motor 37 through a speed reducer 38.

As the carriage moves from its position shown in full lines in Figure 2 and approaches the end of such travel to the right, a stop 40 engages pin 33, thereby rotating lever 32 counterclockwise and past its overcenter position thereby allowing carrier 27 and the die cleaner and torches to move to their lowermost position, in which position the die cleaner is operative to perform its intended function as it moves transversely of the machine from right to left as viewed in Figure 2. Pivotally mounted adjacent the outer end of track 24 is an overbalanced lever 42 having a bifurcated inner free end 43. The normal at-rest position of lever 42 is maintained by a stop pin 44 which limits the clockwise rotation of the lever 42 about its pivot. The vertical position of the lever end 43 is such that as the carriage 25 approaches the end of its die trimming stroke, the pin 33 will engage in the bifurcations and move the toggle links 32 and 34 to their overcenter positions as shown in full lines in Figure 2, thereby moving carrier 27 to its uppermost position, which position will be maintained by reason of the overcenter position of the center of pivot pin 33 until such pin again engages the stop 40.

In operating the flash welding machine embodying the principles of this invention, with the slide 16 moved to its outer position and the vertically movable electrodes or dies 12 and 15 in retracted position, the strip indicated by reference numeral 47 may be run through the machine in the direction shown in Figure 1 and as the trailing end approaches the face of the dies 11 and 12 such movement is interrupted and fluid pressure admitted to cylinder 13 to secure the strip between the dies 11 and 12. Inasmuch as the trailing end of the strip extending outwardly from the face of the dies 11 and 12 will be subsequently trimmed in the welding machine the positioning of the trailing end of the strip may be approximate, it being only necessary that sufficient stock be provided to enable the line of cut effected by the torch 29 to be uninterrupted. The leading end of the next succeeding piece of strip, designated by reference numeral 48, is moved into the machine to a position inwardly of the face of the die set 14 and 15. Here too the exact positioning of the end of the strip is not essential. The lighted torches 29 and 30 supplied by gas through conduit 49 are now moved across the upper surface of the strip pieces and in doing so, will effect lines of cut across the strip as indicated at 50 in Figure 5. Since the torches 29 and 30 are fixed with respect to each other and with respect to the carriage 25 and since the latter moves along the path parallel with the inner faces of the two die sets the lines of cut accomplished by the torches will be parallel with each other and with the faces of the die sets. Outward movement of the slide 16 is limited by a positive stop 51 which provides an accurate and automatic control of the interval between the face of the die set 14 and 15 and the line of cut in the strip 48. Likewise, the extent of projection of strip 47 of the face of die set 11 and 12 is uniform and controlled.

Upon completion of the torch cutting operation, the guide 26 and carrier 27 reposes in an out of the way position shown in dotted lines in Figure 2 and the welding transformer 20 and the upsetting slide motor are immediately energized to effect the electrical welding operation before any substantial amount of heat imparted to the metal by the gas torches is dissipated. This enables a softer and more ductile weld to be effected since the temperature gradient between the edges being welded and the mass of metal adjacent thereto is substantially decreased. It is well-known in the welding art that if immediately upon completion of the welding operation the metal welded is too rapidly cooled through critical temperatures, the metal of the weld is undesirably hard and brittle.

Upon completion of the welding operation, the upper dies 12 and 15 are raised and the welded strip 47—48 is run through the machine on suitable conveyor or roller tables. As the end of strip section 48 clears the face of dies 11, 12, movement of the strip is stopped. Slide 16 has or will now be moved to outer position providing a fixed interval between the two die sets and the inner faces of the dies are machined or cleaned by moving carriage 25 to the opposite sides of the machine to the position shown in full lines in Figure 2. Die cleaner 28 is supported from carriage 25 as pointed out above and as it traverses the dies in this direction it is in lower or die cleaning position. By maintaining the die faces free of protruding metal or scale particles, better and more uniform welds are accomplished. If a continuous length of strip is to be provided, the previously welding section is moved back until the trailing end thereof projects a sufficient distance past dies 11, 12 which are thereupon brought together to securely clamp the strip. The leading end of the next succeeding piece of strip is now conveyed into the machine and the operations outlined above are repeated.

It should now be apparent that we have provided a novel method and apparatus for welding metal sections which satisfactorily accomplishes the objects initially set out. By use of the invention it is possible to simplify the apparatus required to expeditiously weld the sections and the welding may be accomplished with greater accuracy in a shorter length of time. It eliminates the requirements of a highly accurate trimming shear, precise side guides at the shear and welder, the spacer and control therefor in the welding machine, and apparatus for further retracting the welding machine slide to allow the spacer to be withdrawn. From an electrical standpoint, the nature of the torch cut is such that arcing is facilitated and by reason of the preheating a more uniform and more ductile weld is achieved.

While the invention has been described in connection with strip and sheet welding to which it is most advantageously adaptable it should be obvious that it is also adaptable to other specific uses. Also it should be understood that insofar as the invention is concerned it is immaterial whether the strip or sheet be flat or formed to special shape before the welding operation. The above specifically described apparatus should be taken as illustrative only as obviously many changes may be made therein without departing from the spirit or scope of the invention. Reference should therefore be had to the appended claims in determining the scope of the invention.

What we claim is:

1. In apparatus for flash welding metal strip and the like in end to end relation and having spaced parallel means to grip the pieces to be welded and to conduct current thereto adjacent their projecting and opposed edges together with means to move said gripping means toward each other to effect the flashing and upsetting of the opposed edges of said pieces, the combination of means comprising a pair of spaced gas cutting torches to trim said edges while the pieces are held in said gripping means, a movable support guided for movement along a path generally parallel with said gripping means, said torches being normally fixed in relation to each other and carried on said support, said torches being operative to form undulated surfaces on said edges whereby the starting of the flashing is facilitated and to preheat the metal adjacent said edges whereby a more ductile weld results from the flash welding operation.

2. In electric flash welding apparatus having spaced elongated means to grip metal pieces to be welded and to conduct current thereto adjacent the projecting opposed edges thereof together with means to move said gripping means toward each other to effect the flashing and upsetting in the welding process, the combination of a support mounted for movement along a path generally parallel with said elongated gripping and current conducting means, means to move said support along said path, a pair of spaced gas cutting torches carried by said support and adapted to trim said projecting edges while said pieces are held in said gripping means in such manner that generally parallel but undulated welding surfaces are formed on the opposed edges of the pieces to be welded together whereby the start of the flashing is facilitated while the metal of the pieces adjacent said edges is preheated.

3. In electric flash welding apparatus having spaced parallel work clamping electrodes to retain pieces to be welded together and to conduct current thereto adjacent their opposed edges together with means to move said electrodes toward each other to effect flashing and upsetting of the edges in the welding process, the combination of a carriage mounted for movement along a path generally parallel with said electrodes, a support carried by said carriage and movable vertically with respect thereto, a pair of spaced gas cutting torches mounted on said support and adapted to trim the edges of the work pieces held in said clamping electrodes preparatory to the welding operation, said torches being operative to provide generally parallel but undulated edges whereby the starting of the flashing is facilitated and to preheat the metal of said pieces adjacent said edges whereby the resulting weld is of greater ductility.

4. In electric flash welding apparatus having spaced electrodes to grip lengths of metal sheet or strip to be welded in end to end relation and to conduct current thereto adjacent their opposed edges together with means to move said electrodes toward each other to effect the flashing and upsetting of the opposed edges of said lengths, the combination of a pair of spaced gas cutting torches mounted for movement substantially parallel with the opposed faces of said electrodes along paths intermediate said faces to trim the opposed edges of said lengths along generally parallel lines while preheating the metal of said lengths adjacent said edges and providing generally parallel welding edges having surfaces of undulating character whereby the start of the flashing betwen the trimmed edges is facilitated, and means to move said torches along said paths.

5. In electric flash welding apparatus having means to grip metal pieces to be welded and to conduct current thereto adjacent their opposed edges together with means to move said gripping means toward each other to effect the flashing and upsetting of the opposed edges of said pieces, the combination of a pair of spaced gas cutting torches arranged to trim said edges while the pieces are held in said first mentioned means along generally parallel lines to preheat the metal of said pieces adjacent said edges and to provide generally parallel welding edges having surfaces of undulating character whereby the start of the flashing between the trimmed edges is facilitated, and means to move said torches.

6. In electric flash welding apparatus having means to grip metal pieces to be welded and to conduct current thereto adjacent their opposed edges together with means to move said gripping means toward each other to effect the flashing and upsetting of the opposed edges of said pieces, the combination of means to trim said edges while said pieces are held by said gripping means comprising a gas flame cutting tool, and means to move said tool across said pieces whereby welding edges of undulating character are provided to facilitate the start of the flashing, said tool being also operative to preheat the metal of said pieces adjacent the trimmed edges.

7. In electric flash welding apparatus having means to grip metal pieces to be welded and to conduct current thereto together with means to move said gripping means toward each other to effect the flashing and upsetting in the welding process, the combination of means to trim the projecting edge of a metal piece while the same is held in said gripping means preparatory to the welding operation, said trimming means comprising a gas cutting torch and a movable support therefor whereby the metal of said piece adjacent said projecting edge is preheated while the surface of said trimmed edge is of undulating character to facilitate the start of the flashing, and means to move said support.

8. In the method of electric flash welding wherein the opposed edges of the pieces to be welded together are trimmed to provide parallel welding edges while the pieces are held in alignment preparatory to the flash welding operation; the improvement which comprises effecting said trimming by a flame machining operation whereby the metal of said pieces adjacent said edges is preheated and the opposed welding edges are made of an undulating character which facilitates the starting of the flashing, and effecting said flash welding operation before said metal has appreciably cooled and while maintaining said alignment of the pieces.

9. The herein described method which comprises flame machining the opposed edges of metal pieces to be flash welded together to provide welding edges of undulating character whereby the starting of the flashing operation is facilitated and to preheat the metal of said pieces adjacent said edges, and initiating said flashing operation before said metal has appreciably cooled.

10. The herein described method which comprises flame machining an edge of a metal piece to be electrically flash welded to a second metal piece to provide a trimmed welding edge of undulating character whereby the starting of the flashing operating is facilitated and to preheat the metal of said first mentioned piece adjacent said edge, and initiating said flashing operation before said metal has appreciably cooled.

CLYDE E. COATES.
JOSEPH H. COOPER.